Patented Feb. 10, 1948

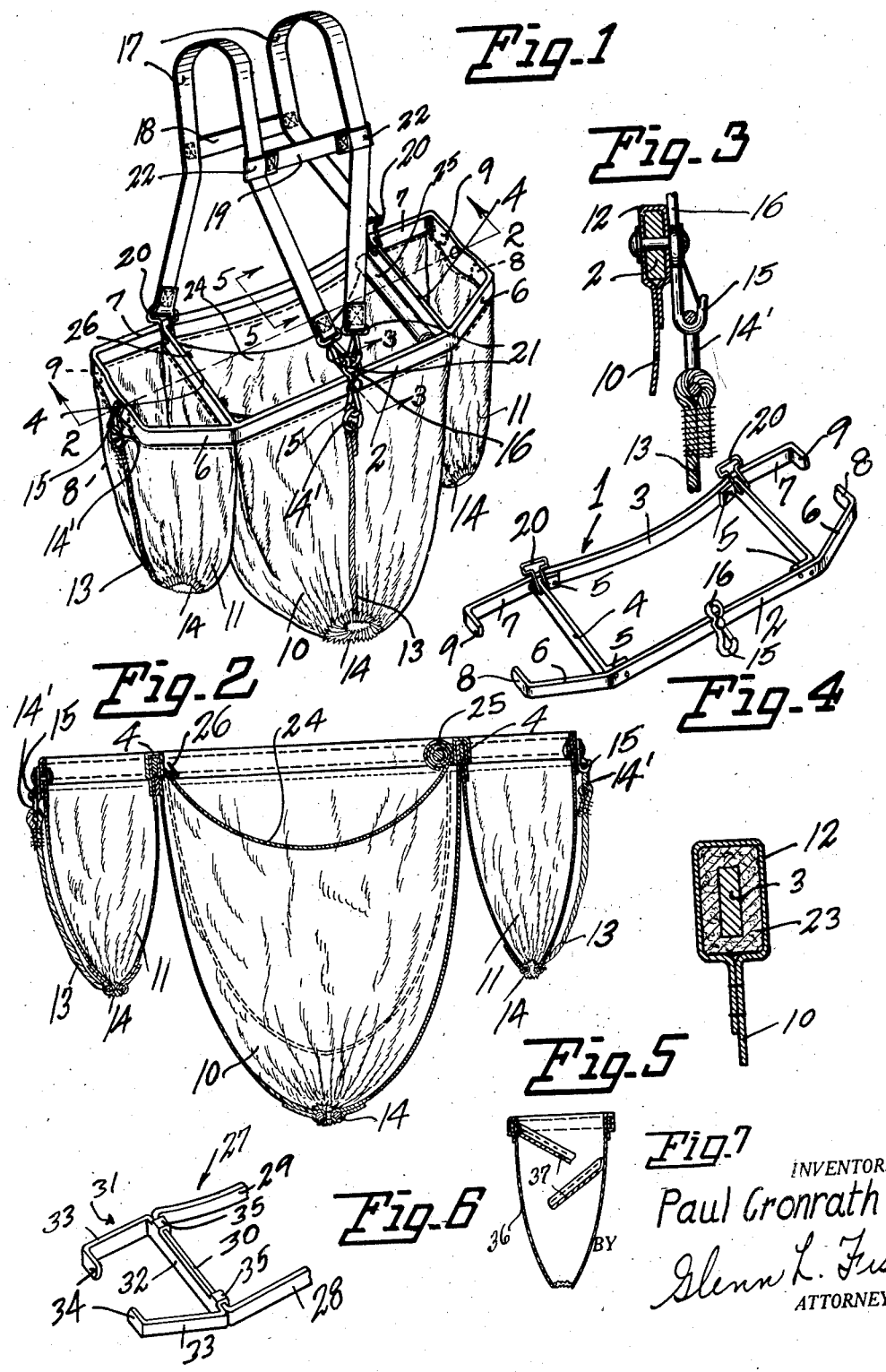

2,435,921

UNITED STATES PATENT OFFICE 2,435,921

FRUIT PICKING BAG

Paul Cronrath, Spokane, Wash.

Application December 10, 1945, Serial No. 633,971

2 Claims. (Cl. 150—2)

This invention relates to a fruit picker's bag and it is one object of the invention to provide a device which is so constructed that it may be mounted across the waist of a picker where it will be in such position that fruit may be very easily dropped into the bag as it is picked from a tree.

Another object of the invention is to provide a bag or receptacle having a frame so formed that a main bag and auxiliary bags may be suspended therefrom with the main bag directly in front of the picker and the auxiliary bags at opposite sides of the main bag, thus allowing the picker to drop fruit of the best grade into the main bag and fruit of a lower grade in the auxiliary bags and thus save time in sorting the fruit after it has been picked.

Another object of the invention is to provide a fruit receptacle having bags provided with open bottoms normally closed by draw strings which are held under tension to retain the bags closed by engaging rings at ends of the draw strings with hooks carried by a frame from which the bags are suspended.

Another object of the invention is to provide a fruit receptacle wherein bags are suspended from a frame provided with harness by means of which the frame is suspended across the waist of the picker, the harness having straps for engaging over shoulders of the picker and having their front ends provided with hooks for engaging a ring or eye at the upper end of a hook with which a draw string for holding the lower end of one bag closed is detachably connected.

Another object of the invention is to provide a fruit receptacle including a bag suspended from a frame and provided at its upper top with a fabric strip or sheet which is wound upon a spring roller and constitutes a yieldable member for supporting fruit dropped into the bag and allowing the fruit to settle in the bag as weight of the fruit unwinds the fabric strip of sheet from the roller.

Another object of the invention is to provide the fruit receptacle wherein bags are carried by a frame, certain of the bags being suspended from end portions of the frame which are detachably mounted upon end portions of the main section of the frame so that other bags may be applied when necessary.

The invention is illustrated in the accompanying drawings wherein:

Fig. 1 is a perspective view of the improved fruit picker's receptacle.

Fig. 2 is a sectional view taken vertically along line 2—2 of Figure 1.

Fig. 3 is a fragmentary sectional view upon an enlarged scale taken along the line 3—3 of Figure 1.

Fig. 4 is a perspective view of a frame from which bags are suspended.

Fig. 5 is a sectional view taken along the line 5—5 of Figure 1.

Fig. 6 is a perspective view showing an end portion of a modified form of frame, and Fig. 7 is a view of a modified form of bag showing a zig-zag path for the fruit.

This improved fruit picker's receptacle has a frame 1 formed as shown in Figure 4 and consisting of front and rear bars or strips 2 and 3 between which extend cross bars 4. The bars or strips are preferably formed from metal strips and ends of the cross bars are bent to form ears 5 which are riveted to the front and rear bars. End portions 6 and 7 of these bars project from the cross bars and these end portions are bent to extend in converging relation to each other and terminate in transversely extending ears 8 and 9 which are spaced from each other as shown in Figure 4.

The frame carries a main bag 10 and auxiliary bags 11 which are formed of fabric and about their upper ends the bags are formed with hems providing each bag with a portion 12 about its margin to receive the bars forming the frame and permit the bags to be suspended from the frame as shown in Figures 1 and 2. The bags are open at their lower ends and in order to close the lower ends of the bags there have been provided draw strings 13 which are threaded through hems 14 about lower ends of the bags. When the draw strings are drawn upon, the lower ends of the bags will be drawn to a closed position and fruit will be held in the bags until the draw strings are released and the lower ends of the bags allowed to open. Each draw string has a ring 14' at its free end and when these rings are engaged with snap hooks 15 the draw strings will be held in the raised position shown in Figures 1 and 2 and the bottoms of the bags will remain closed. The hooks for engagement by the rings of the draw strings for the auxiliary bags are riveted to portions of the hemmed upper edges of these bags between ends of the bars 2 and 3 but the hook for the main bag is riveted to the front bar midway the width of the frame and this hook is formed with an upstanding eye 16 which projects upwardly from the front bar as shown in Figures 1 and 3.

The fruit holder is to be suspended in front of a person across the waist line and in order to do so there has been provided a harness shown in Figure 1. This harness consists of straps 17, 18, and 19, the straps 17 being shoulder straps and having their rear ends secured through loops 20 carried by the rear bar 3 at rear ends of the cross bars 4. When the fruit holder is put on, the picker passes his head and shoulders upwardly through the space defined by the straps 17 and 18 or he may step into this space and draw the fruit holder upwardly until the frame extends across his waist. The straps 18 are then brought forwardly over his shoulders and the strap 19 will be disposed in front of him, the snap hooks 21 at the front ends of the shoulder straps being engaged with the eye or loop 16. The strap 19 has loops 22 at its ends through which the straps 17 pass so that after the hooks 21 have been engaged with the eye 16 the strap 19 may be shifted along the straps 17 to a position causing the harness to fit comfortably about the picker's body. The rear bar 3 is padded, as shown at 23 in Figure 5, to prevent it from cutting into the picker's body.

When fruit is picked from a tree the picker places the best fruit in the main bag 10 and small fruit or fruit of an inferior grade will be placed in the auxiliary bags 11. When the bags are filled it is merely necessary to detach the rings 14 from the hooks 15 and the weight of the fruit will cause the lower ends of the bags to open and the fruit will pass out of the bags into a suitable receptacle or onto a table or bench over which the fruit holder is disposed.

The high grade fruit in the main bag should be prevented from becoming bruised when dropped into the bag and in order to do so there has been provided a strip of fabric 24 which is wound upon a spring roller 25. This roller is mounted across one side of the open upper end of the main bag in close parallel relation to one of the cross bars 4 and the fabric strip or sheet extends across the bag and has its outer end secured by fasteners 26. When fruit is placed in the main bag it rests upon the strip or curtain 24 and as the weight of the fruit in the bag increases the strip of fabric will be gradually unwound from the roller and moved downwardly towards the bottom of the bag, as indicated by dotted lines in Figure 2. Therefore the fruit will not drop in the bag a sufficient distance to cause it to be bruised, when picked from a tree and deposited in the bag. When the draw string for the main bag is released and the bottom of the bag allowed to open the fruit in the bag will roll from opposite side edges of the curtain and out of the open bottom of the bag. The spring roller will then rewind the curtain onto the roller and return the curtain to the position shown in full lines in Figure 2.

Instead of forming the frame as shown in Figure 4 it may be formed as shown in Figure 6. In this embodiment of the invention, the frame has a main section 27 which is oblong and shaped to conform to the portion of frame 1 between the cross bars 4. This frame 27 has front and rear bars 28 and 29 and at each end has an end bar 30. Instead of providing front and rear bars of the frame 27 with portions projecting from its cross bars there have been provided auxiliary frames, one of which is shown in Figure 6. This auxiliary frame 31 is formed from a strip of metal bent to form a bridge 32 having arms 33 projecting therefrom. The arms 33 extend from the bridge in converging relation to each other and their outer ends are bent inwardly to form tongues or fingers 34 corresponding to the fingers 8 and 9. Tongues project from the upper edge of the bridge 32 and these tongues are bent to form hooks 35 for engaging over the end bar 30 of the frame 27 and support the auxiliary frame from the end bar of the main frame. In view of the fact that the auxiliary frames are formed separate from the main frame a manufacturer may make auxiliary frames of different sizes and selectively apply them to the main frame.

The bag 36 shown in the modified form of Fig. 7 is provided with strips of canvas 37 set at an angle to guide the fruit by a zig-zag route to the lower portion of the bag. When placing the fruit into the bag it contacts the strips 37 breaking the fall and thus protecting the fruit from bruising.

Having thus described the invention, what is claimed is:

1. A fruit picker's receptacle comprising a frame having front and rear bars and cross bars, the front and rear bars having end portions projecting from the cross bars and bent inwardly toward each other at their ends, a main bag carried by said frame between the cross bars, additional bags carried by said frame between the cross bars and ends of the front and rear bars and suspended therefrom at opposite sides of the main bag, and means for supporting said frame in front of a person at approximately the waist line.

2. A fruit picker's receptacle comprising a frame having a main portion and end portions, a main bag carried by the main portion of said frame and extending downwardly therefrom, auxiliary bags carried by the end portions of the frame and extending downwardly therefrom at opposite sides of the main bag, a support carried by said frame, a spring roller mounted across one end of the main portion of said frame, and a sheet wound upon said roller and extending across the top of the main bag and being free along its side edges and secured at its distant end to the frame and being adapted to be unwound from the roller and moved downwardly in the bag by weight of fruit deposited upon the sheet between its attached end and the roller.

PAUL CRONRATH.

REFERENCES CITED

The following references are of record in the file of this patent:

UNITED STATES PATENTS

| Number | Name | Date |
|---|---|---|
| 444,884 | Howell | Jan. 20, 1891 |
| 929,209 | Grant | July 27, 1909 |
| 1,085,887 | Yeates | Feb. 3, 1914 |
| 1,383,956 | Kiely et al. | July 5, 1921 |
| 1,459,599 | Minor | June 19, 1923 |
| 1,797,097 | May | Mar. 17, 1931 |

FOREIGN PATENTS

| Number | Country | Date |
|---|---|---|
| 25,300 | Australia | Nov. 10, 1936 |